United States Patent
Gorti et al.

(10) Patent No.: US 7,853,602 B2
(45) Date of Patent: Dec. 14, 2010

(54) SYSTEM AND METHOD FOR CREATING AN ENHANCED ENTERPRISE DIRECTORY

(75) Inventors: Sreenivasa Rao Gorti, Austin, TX (US);
Anil K. Doradla, Austin, TX (US);
David Randall Wolter, Austin, TX (US)

(73) Assignee: AT&T Intellectual Property, I, L.P., Reno, NV (US)

( * ) Notice: Subject to any disclaimer, the term of this patent is extended or adjusted under 35 U.S.C. 154(b) by 518 days.

(21) Appl. No.: 11/338,004

(22) Filed: Jan. 24, 2006

(65) Prior Publication Data

US 2007/0174265 A1 Jul. 26, 2007

(51) Int. Cl.
*G06F 17/30* (2006.01)
*G06F 7/00* (2006.01)

(52) U.S. Cl. ........................ 707/753; 707/727; 707/730; 707/951

(58) Field of Classification Search ........................ None
See application file for complete search history.

(56) References Cited

U.S. PATENT DOCUMENTS

| | | | |
|---|---|---|---|
| 6,026,396 A * | 2/2000 | Hall ............................... 707/4 |
| 6,604,141 B1 | 8/2003 | Ventura | |
| 6,901,394 B2 * | 5/2005 | Chauhan et al. ................ 706/60 |
| 7,096,232 B2 * | 8/2006 | Doss et al. ................ 707/104.1 |
| 2001/0032244 A1 | 10/2001 | Neustel | |
| 2002/0087520 A1 | 7/2002 | Meyers | |
| 2002/0103873 A1 | 8/2002 | Ramanathan et al. | |
| 2003/0144895 A1 | 7/2003 | Aksu et al. | |
| 2004/0267730 A1 | 12/2004 | Dumais et al. | |
| 2006/0041553 A1 * | 2/2006 | Paczkowski et al. ............ 707/7 |
| 2007/0130182 A1 * | 6/2007 | Forney ........................ 707/101 |

* cited by examiner

*Primary Examiner*—Greta L Robinson
*Assistant Examiner*—James J Wilcox
(74) *Attorney, Agent, or Firm*—Cantor Colburn LLP

(57) ABSTRACT

A knowledge management system and method is described. The knowledge management system and method comprises the steps of receiving a user search term from a user, searching an index for at least one identifier of an expert based upon the user search term, ranking the at least one identifier by an activity factor and a reputation factor, compiling a search result based on the ranking and transmitting the search result to the user.

29 Claims, 3 Drawing Sheets

SYSTEM AND METHOD FOR CREATING AN ENHANCED ENTERPRISE DIRECTORY

TECHNICAL FIELD

The present disclosure generally relates to knowledge management and enterprise telecommunications systems and methods.

BACKGROUND

Large organizations, such as multinational corporations, offer a wide array of products and services. In order to offer this wide array of products and services, organizations generally employ large numbers of employees that may number in the tens of thousands or even hundreds of thousands. Because of the varying levels of knowledge and experience possessed by each employee, organizations may find it difficult to identify the employee best suited to answer a question in a specific subject matter. Some organizations have created large databases in an effort to categorize their employees by knowledge and experience. These databases are searchable and can be used by others to identify the best employees suited to answer a question in a specific subject matter. However, maintenance of these databases may be costly because these databases may be frequently updated to account for employee turnover and changes in the employees' knowledge and experience.

Therefore, there exists a need for a system that can identify the employee best suited to answer a question on a subject while at the same time be cost effective.

DETAILED DESCRIPTION

A knowledge management system and method is described. The method comprises the steps of receiving a user search term from a user, searching an index for at least one identifier of an expert based upon the user search term, ranking the at least one identifier by an activity factor and a reputation factor, compiling a search result based on the ranking and transmitting the search result to the user. The index may comprise, email information, calendaring information and desktop information.

The knowledge management system comprises a processor, a storage device in communication with the processor, the storage device containing an index and a memory unit in communication with the processor, the memory unit containing instructions executable by the processor, the instructions configuring the processor to receive a user search term from a user, search the index for at least identifier of an expert based upon the user search term, rank the at least one identifier by an activity factor and a reputation factor, compile a search result based on the ranking, and transmit the search result to the user. The index may comprise, email information, calendaring information and desktop information.

Figure 1:
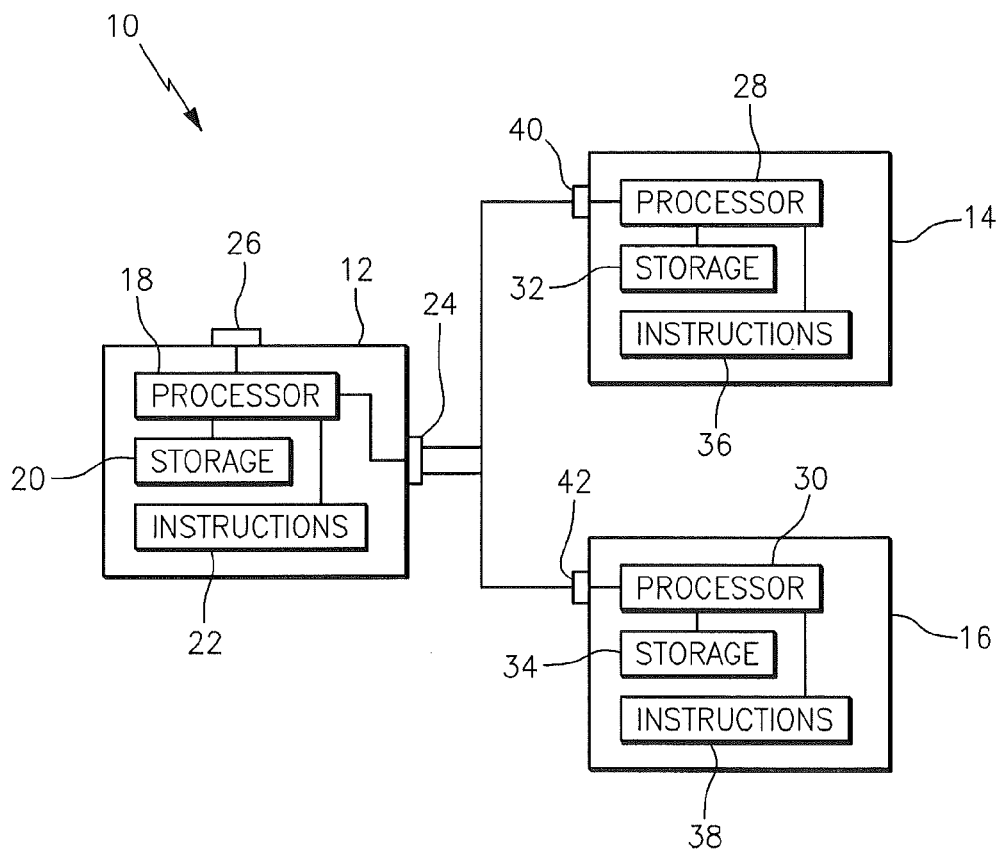
FIG. 1 is a block diagram of a knowledge management system embodying the principles of the present invention.

Referring to FIG. 1, a knowledge management system 10 is shown. The knowledge management server includes an email server 12, a first personal computer 14 and a second personal computer 16.

The email server 12 includes a processor 18 connected to a storage device 20 and a memory unit 22. The storage device 20 may contain employee email and calendaring information. The storage unit 20 may be a hard disk, an optical storage device, solid state memory or may be any storage device capable of storing information. The memory unit 22 contains processor executable instructions and may be hard disk, an optical storage device, a solid state memory or any device capable of containing processor executable instructions. The processor 18 is further connected to a local interface 24 and a non local interface 26. The local interface 24 may connect the email server 12 to devices within a local area network such as the first and second personal computers 14, 16. The non local interface 26 may connect the email server to non local devices and/or networks such as the Internet.

The email server 12 may be a Microsoft Exchange email server or any of a number of types of email servers. As stated previously, the storage device 20 will store email and calendar information including text of email subject lines and text of the body of emails. As to the calendaring information, the storage device 20 may contain meeting times, meeting subjects and meeting durations.

The personal computers 14, 16 are connected to network interfaces 40, 42 respectively. The network interfaces 40, 42, are then connected to the local network interface 24. By so doing, the personal computers 14, 16 will then be able to communicate with the email server 12. It should be understood that any number of personal computers may be connected to the email server 12. Furthermore, the personal computers 14, 16 may be a general purpose computer or a dedicated device such as a terminal or wireless device such as a wireless personal digital assistant (PDA).

The first and second personal computers 14, 16 each include a processor 28, 30 connected to storage devices 32, 34 and memory units 36, 38, respectively. The storage devices 32, 34 of the personal computers 14, 16 may be hard disk, optical storage devices, solid state memory, or other devices capable of storing electric information. The memory units 36, 38 may be hard disks, optical storage devices, solid state memory or maybe a device capable of storing processor executable instructions.

Figure 2:
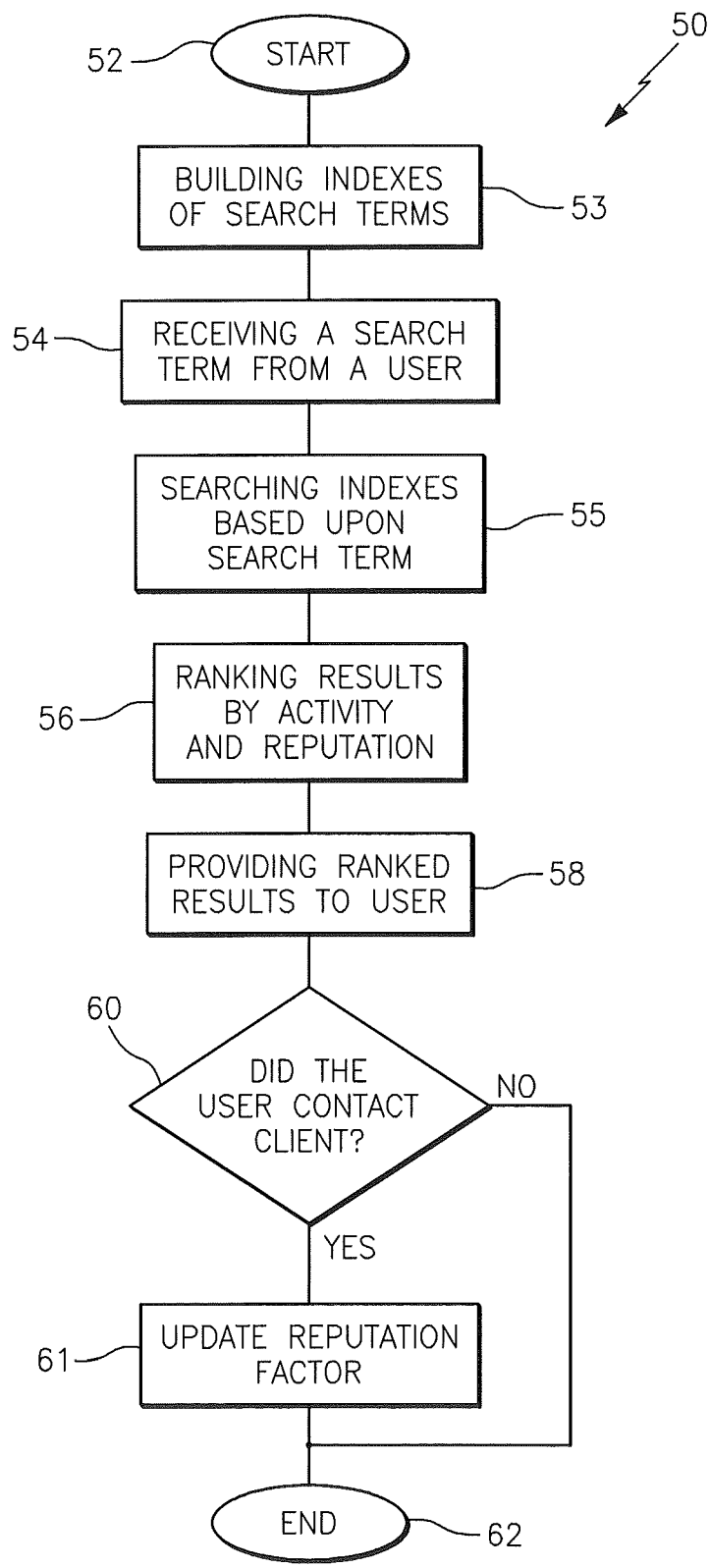
FIG. 2 is a method utilized by the knowledge management system embodying the principles of the present invention.

FIG. 2 illustrates a method for searching for the correct employee to contact regarding a specific subject matter. The method 50 may be contained within the instructions of the memory unit 22 of the email server 12 or any other computer readable medium. The processor 18 of the email server 12 will execute the instructions containing the method 50.

Block 52 denotes the start of the method 50. As shown in block 53, indexes of search terms are compiled by searching email information, calendaring information and desktop information. The compilation of the indexes is a process that may happen once or on a continual basis and systematic basis.

Email information may include text within an email subject line, text within a body of an email and/or instant messaging information. Calendaring information may include subject matter of any meetings attended and the duration of those meetings. The email and calendaring information may be contained within the storage device 20 of the email server 12 or within the storage devices 32, 24 of personal computers 14, 16. Desktop information may include information within one or more files contained within a storage devices 32, 24 or personal computers 14, 16.

As illustrated in block 54, a user search term is provided by the user. The user search term may be a single term or may be multiple terms. The user search term relates to the specific subject matter searched. For example, if the user enters the terms "voice over Internet protocol", the search, as described in detail below, will focus on the terms "voice over Internet protocol."

Once the user search term is received, the indexes are searched for at least one employee identifier based upon the user search term. The scope of the search may include everything which was compiled within the indexes as described above, such as email information, calendaring information and desktop information.

Once the search has been completed, results are produced. The results are a list of employee identifiers ranked by an activity and a reputation factor relating to the subject matter of the user search term. The employee identifiers will contain the employee's contact information. The contact information may include telephone contact information, facsimile contact information, email address information and location information.

The activity factor is a relevancy factor based upon the frequency the user search term was found within the indexes originating from email information, calendaring information and/or desktop information. Reputation is a relevancy factory based on the frequency in which the employee has been contacted in the past regarding the specific subject matter of the user search term. If the client is contacted by the user, reputation is updated as will be later described.

Once ranked, the results of the search are provided to the user, as shown in block 58. Once the results have been provided to the user, a determination is made if the user has contacted one of the employees listed in the search results, as shown in block 60. If one of the employees listed in the search result has been contacted, the reputation of that employee is updated to indicate that the employee has been contacted, as shown in block 61. Thereafter, the method ends as denoted by block 62.

Alternatively, the method 50 may be limited to searching email information, calendaring information and desktop information on the storage devices 32, 34 of personal computers 14, 16. By using this alternative approach, users of personal computers 14, 16 may have the option of limiting the scope of materials searched by the method 50. For example, if a user wishes to exclude personal email from the scope of searchable materials, the user may make this designation. Therefore, the method 50 may be contained within the instructions of the memory units 36, 38 of the personal computers 14, 16. The processors 28, 30 of the personal computers 14, 16 will execute the instructions containing the method 50.

Additionally, the method 50 may limit the search results provided to the user based on the user's status. For example, if the user is a technical person, such as an engineer, the search results may only show other engineers. Conversely, if the user is a non-technical person, the search results may only show non-technical employees.

Figure 3:
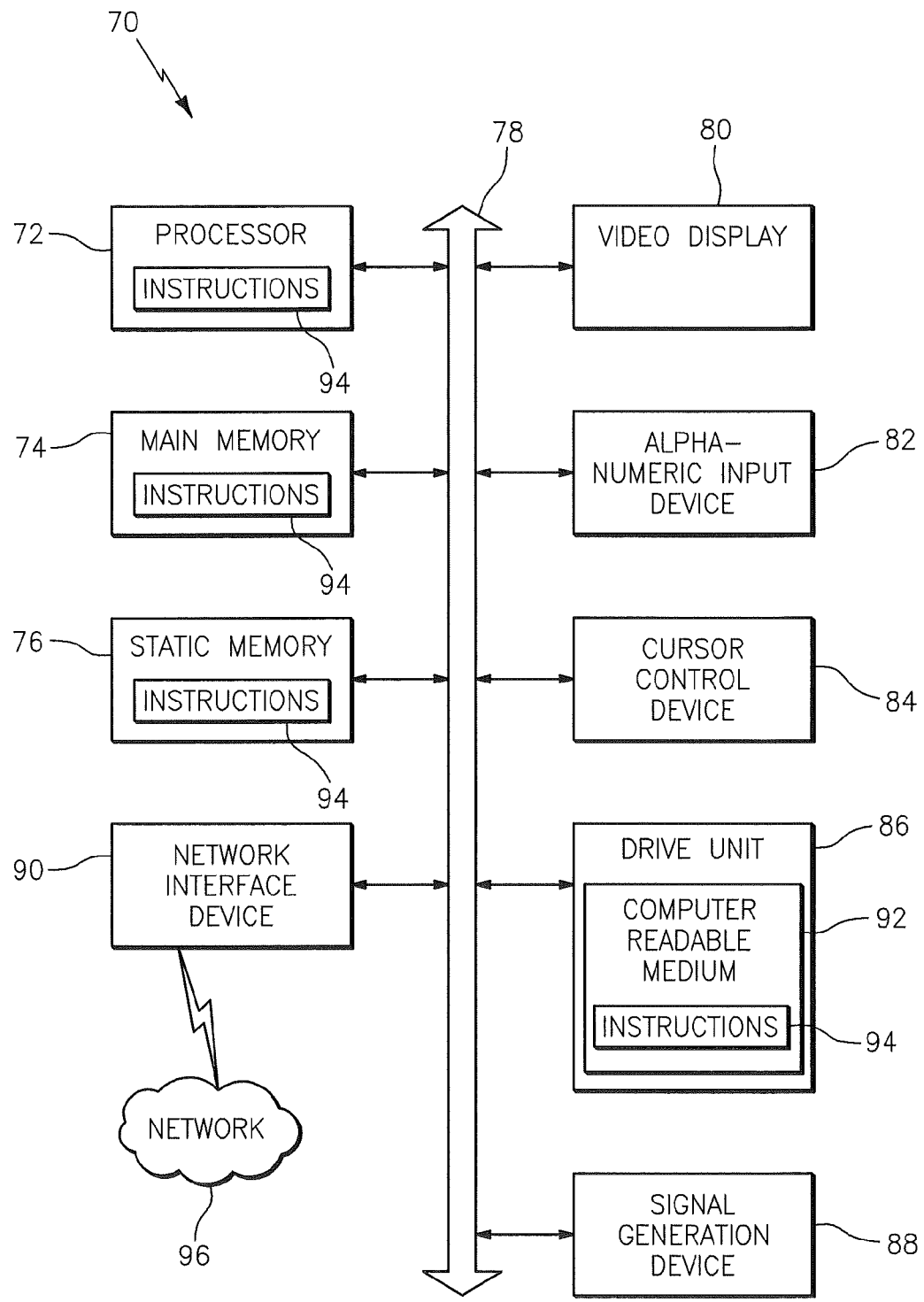
FIG. 3 is a general purpose computer embodying the principles of the present invention.

Referring to FIG. 3, an illustrative embodiment of a general computer system is shown and is designated 70. The computer system 70 can include a set of instructions that can be executed to cause the computer system 70 to perform any one or more of the methods or computer based functions disclosed herein. The computer system 70 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 70 can also be implemented as or incorporated into various devices, such as a personal computer (PC), a tablet PC, a set-top box (STB), PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 70 can be implemented using electronic devices that provide voice, video or data communication. Further, while a single computer system 70 is illustrated, the term "system" shall also be taken to include any collection of systems or sub-systems that individually or jointly execute a set, or multiple sets, of instructions to perform one or more computer functions.

As illustrated in FIG. 3, the computer system 70 may include a processor 72, e.g., a central processing unit (CPU), a graphics processing unit (GPU), or both. Moreover, the computer system 70 can include a main memory 74 and a static memory 76 that can communicate with each other via a bus 78. As shown, the computer system 70 may further include a video display unit 80, such as a liquid crystal display (LCD), an organic light emitting diode (OLED), a flat panel display, a solid state display, or a cathode ray tube (CRT). Additionally, the computer system 70 may include an input device 82, such as a keyboard, and a cursor control device 84, such as a mouse. The computer system 70 can also include a disk drive unit 86, a signal generation device 88, such as a speaker or remote control, and a network interface device 90.

In a particular embodiment, as depicted in FIG. 3, the disk drive unit 86 may include a computer-readable medium 92 in which one or more sets of instructions 94, e.g. software, can be embedded. Further, the instructions 94 may embody one or more of the methods or logic as described herein. In a particular embodiment, the instructions 94 may reside completely, or at least partially, within the main memory 74, the static memory 76, and/or within the processor 72 during execution by the computer system 70. The main memory 74 and the processor 72 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 94 or receives and executes instructions 94 responsive to a propagated signal, so that a device connected to a network 96 can communicate voice, video or data over the network 96. Further, the instructions 94 may be transmitted or received over the network 96 via the network interface device 90.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A computer implemented method for determining an expert, the expert being a person knowledgeable about a subject matter, using an enhanced enterprise directory having an index, the method comprising:
   building an index by searching email information, calendering information and desktop information of a plurality of users, wherein a user of the plurality of users can block the searching of at least one of the email information, calendering information and desktop information by making a designation to exclude at least one of the email information, calendering information and desktop information from the searching;
   receiving a user search term from a user;
   searching the index for at least one expert based upon the user search term;
   ranking the at least one expert by an activity factor and a reputation factor;
   wherein the activity factor is a relevancy factor based upon the frequency in which the user search term was found within the index and associated with the expert;
   wherein the reputation factor is a relevancy factor based on the frequency in which the expert has been contacted previously regarding the subject matter of the user search term;
   compiling a search result based on the ranking; and
   transmitting the search result to the user.

2. The method of claim 1, wherein the index comprises email subject line information.

3. The method of claim 1, wherein the index comprises email body information.

4. The method of claim 1, wherein the index comprises meeting subject information.

5. The method of claim 1, wherein the index comprises meeting duration information.

6. The method of claim 1, wherein the index comprises information contained within one or more files contained within a storage device of the at least one client's personal computer.

7. The method of claim 1, wherein the index comprises instant messaging information.

8. The method of claim 1, wherein the index is stored within a centralized storage device.

9. The method of claim 8, wherein the centralized storage device is an email server storage device.

10. The method of claim 1, wherein the index is stored within a remote storage device.

11. The method of claim 10, wherein the remote storage device is a personal computer storage device used by the at least one client.

12. The method of claim 1, further comprising the step of updating the reputation factor based on the user contacting the at least one expert.

13. The method of claim 1, further comprising the step of limiting the search results based on the user's status.

14. The method of claim 1, further comprising the step of providing contact information for the expert.

15. The method of claim 14, wherein the contact information further comprises one of telephone contact information, facsimile contact information, email address information and location information.

16. A system for determining an expert, the expert being a person knowledgeable about a subject matter, using an enhanced enterprise directory having an index, the system comprising:
   a processor;
   a storage device in communication with the processor, the storage device containing the index; and
   a memory unit in communication with the processor, the memory unit containing instructions executable by the processor, the instructions configuring the processor to:
   build an index by searching email information, calendering information and desktop information of a plurality of users, wherein a user of the plurality of users can block the searching of at least one of the email information, calendering information and desktop information by making a designation to exclude at least one of the email information, calendering information and desktop information from the searching;
   receive a user search term from a user,
   search the index for at least one expert based upon the user search term,
   rank the at least one expert by an activity factor and a reputation factor,
   wherein the activity factor a relevance factor based upon is the frequency in which the user search term was found within the expert and associated with the expert,
   wherein the reputation factor is the frequency in which the expert has been contacted previously regarding the subject matter of the user search term,
   compile a search result based on the ranking, and
   transmit the search result to the user.

17. The system of claim 16, wherein the index comprises email subject line information.

18. The system of claim 16, wherein the index comprises email body information.

19. The system of claim 16, wherein the index comprises meeting subject information.

20. the system of claim 16, wherein the index comprises meeting duration information.

21. The system of claim 16, wherein the index comprises information contained within one or more files contained within a storage device of the at least one client's personal computer.

22. The system of claim 16, wherein the index comprises instant messaging information.

23. The system of claim 16, wherein the instructions configure the processor to update the reputation factor based on the user contacting the at least one expert.

24. The system of claim 16, wherein the memory unit is a solid state storage device.

25. The system of claim 16, wherein the memory unit is integrated within the processor.

26. The system of claim 16, wherein the storage device is at least one of a magnetic storage device, an optical storage device, and a solid state storage device.

27. The system of claim 16, wherein the instructions configure the processor to provide contact information for the expert to the user.

28. The system of claim 27, wherein the contact information comprises one of telephone contact information, facsimile contact information, email address information and location information.

29. A computer implemented method for determining an expert, the expert being a person knowledgeable about a subject matter, using an enhanced enterprise directory having an index, the method comprising:
   building an index by searching email information, calendering information and desktop information of a plurality of users, wherein a user of the plurality of users can block the searching of at least one of the email information, calendering information and desktop information by making a designation to exclude at least one of the email information, calendering information and desktop information from the searching;
   receiving a user search term from a user;
   searching the index for at least one expert based upon the user search term, limiting the search results based on the user's status;
   ranking the at least one expert by an activity factor and a reputation factor;
   wherein the activity factor is a relevancy factor based upon the frequency in which the user search term was found within the index and associated with the expert;
   wherein the reputation factor is a relevancy factor based on the frequency in which the expert has been contacted previously regarding the subject matter of the user search term;
   compiling a search result based on the ranking; and
   transmitting the search result to the user;
   providing contact information for the expert, wherein the contact information further comprises one of telephone contact information, facsimile contact information, email address information and location information;
   updating the reputation factor based on the user contacting the at least one expert;
   wherein the index comprises email subject line information, email body information, meeting subject information, meeting duration information, information contained within one or more files contained within a storage device of the at least one client's personal computer, instant messaging information;
   wherein the index is stored within a centralized storage device, the centralized storage device is an email server storage device.

* * * * *